Figure 1:
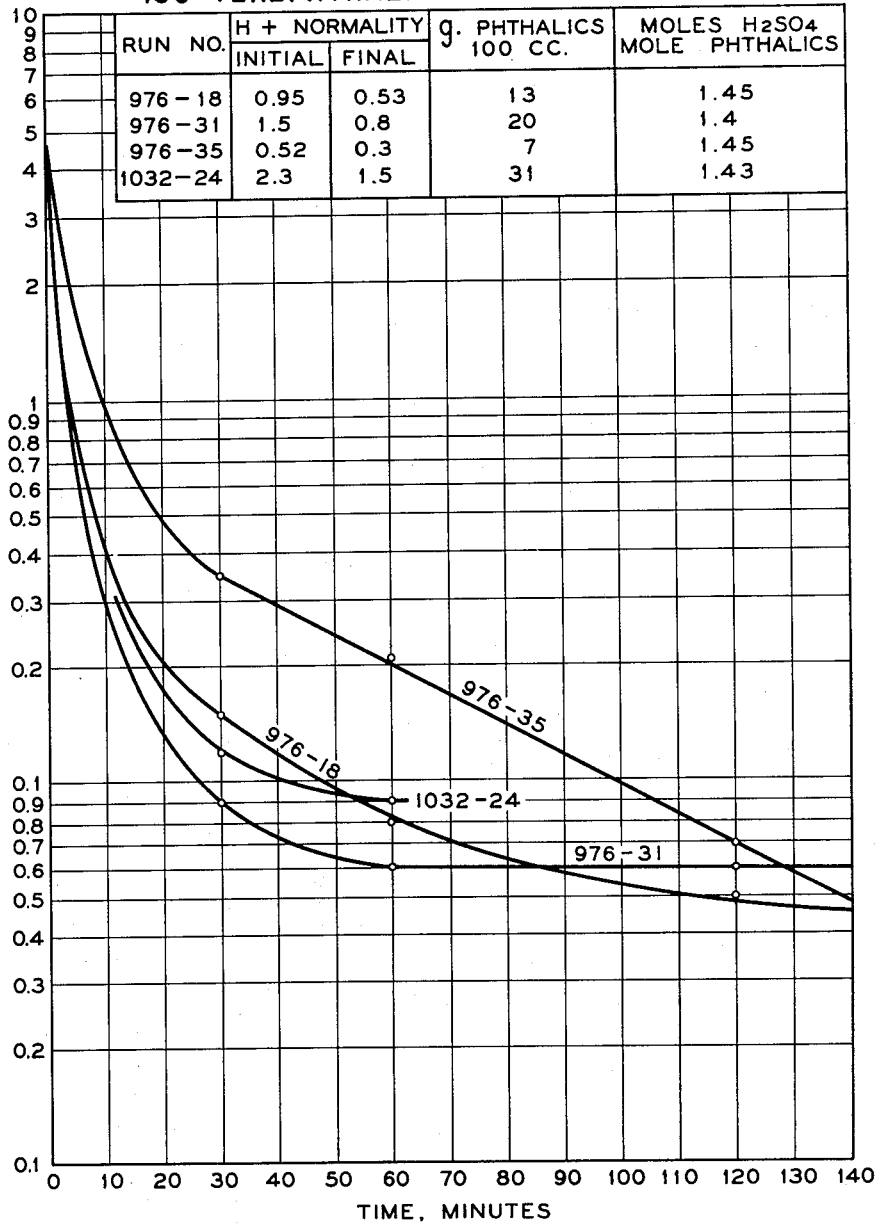

Feb. 7, 1956  J. B. WILKES  2,734,078
HYDROLYSIS OF AMIDES

Filed May 7, 1953  2 Sheets-Sheet 2

INVENTOR
JOHN B. WILKES
BY
ATTORNEYS

2,734,078
HYDROLYSIS OF AMIDES

John B. Wilkes, Albany, Calif., assignor to California Research Corporation, San Francisco, Calif., a corporation of Delaware Application May 7, 1953, Serial No. 353,552

6 Claims. (Cl. 260—515)

This invention relates to a process for hydrolyzing amides of phthalic acids and substituted phthalic acids. More particularly, it relates to a process for substantially completely hydrolyzing the amides of isophthalic acid, terephthalic acid and substituted phthalic acids, such as tertiary-butyl isophthalic acid.

Isophthalic acid, terephthalic acid and tertiary-butyl isophthalic acid are useful in the production of superior alkyd resins. These acids can be produced by oxidizing meta- and para-xylenes with water, sulfur and ammonia as described in U. S. Patent No. 2,610,980. This method of oxidation yields a reaction product containing phthalic acid diamides, ammonium salts of the phthalic acids, and the half-ammonium salt-half-amide of the acids. It would appear that the free acids could be produced by acid catalyzed hydrolysis of the crude reaction mixture. When hydrolysis of the crude mixture of amides, acids, and ammonium salts is attempted, considerable practical difficulty is encountered. If the acids are to be used in the manufacture of alkyd resins, it is necessary that they be almost completely free of amide nitrogen. The amide nitrogen content of the acid must be below 0.03% by weight and preferably below 0.01% by weight when the acid is to be used in alkyd manufacture. The presence of very small amounts of amide nitrogen causes discoloration of the alkyd resin during a conventional alkyd cook. When the amide nitrogen content of the acid is 0.01% by weight, the Gardner color of the alkyds produced by conventional methods is in the range from 5 to 6. If the amide nitrogen content of the acid is as high as 0.04% by weight, the alkyd resins produced from the acid are much too dark to be commercially acceptable. If, on the other hand, the amide nitrogen content of the acid is reduced below 0.01% by weight, alkyd resins having Gardner color values of 3 to 4 are readily produced. So far as is now known, the only commercially feasible method of reducing the amide nitrogen content of the final acid product to the extremely low values which are necessary in alkyd use is substantially complete decomposition of the amides by hydrolysis. These low values cannot be reached employing the methods of hydrolysis which have been applied to other acid amides. Hydrolysis with one equivalent of mineral acid per mole of combined nitrogen would ordinarily be expected to permit complete hydrolysis of an amide. With isophthalic acid, terephthalic acid, and their alkylated derivatives, complete hydrolysis does not occur under these conditions, even if some excess acid is used. Complete hydrolysis is necessary as these phthalic acids and their amides are relatively insoluble and non-volatile and the amide cannot be separated from the acid by any simple previously known method.

It thas been found that the amides of isophthalic acid and terephthalic acid can be substantially completely hydrolyzed to yield an acid product having an amide nitrogen content below about 0.01% by weight by heating the amide with water and a quantity of strong mineral acid in excess of two equivalents of acid per gram atom of combined nitrogen contained in the amide feed. At temperatures below the boiling point of water the hydrolysis is extremely slow and extremely long periods of time are required to carry the hydrolysis reaction to such a degree of completion that the amide nitrogen content of the product is suitably low. For feasible commercial operation the hydrolysis should be carried out at temperatures of at least about 300° F. under a superatmospheric pressure sufficient to maintain the water in lquid phase. At 300° F. it requires a period of about 24 hours for the hydrolysis to proceed to such a degree that the amide nitrogen content of the organic acid product is reduced to 0.01% by weight. Preferably, the hydrolysis is carried out at temperatures above 350° F. and most desirably at temperatures in the range from 400° F. to 500° F. At temperatures in the range from 400 to 500° F. the hydrolysis reaction proceeds very rapidly, the amide nitrogen conetnt of the organic acid product being reduced to a value below 0.03% by weight in 3 to 30 minutes. Further, the water and mineral acid employed in the hydrolysis reaction should be present in the reaction zone in proportion such that the normal concentration of hydrogen ion does not exceed about 6.5 normal, preferably lies in the range from 0.5 to 6 normal, and most desirably in the range from 1 to 4 normal.

The employment in the hydrolysis reaction of a quantity of mineral acid in excess of 2 equivalents per gram atom of combined nitrogen contained in the amide feed is critical to the production of the final acid product having an amide nitrogen content below about 0.01% by weight. If less than 2 equivalents of mineral acid per gram atom of combined nitrogen in the amide feed are employed, the necessary low amide nitrogen content of the final organic acid product is not reached irrespective of the temperature at which the hydrolysis is conducted and irrespective of the time of reaction.

With respect to temperature, it is necessary to use temperatures at about 300° F. or higher if the complete hydrolysis is to be accomplished in a commercially tolerable period of time.

Mineral acid concentrations above 6.5 normal are operable, but at higher concentrations the reaction rate is decreased and corrosion problems incidental to the employment of any type of processing equipment are seriously aggravated.

The data summarized in the following Table I illustrate the effect of variation of the mineral acid content of the hydrolysis reaction mixture on purity of the final organic acid product. The runs summarized in the table were made by hydrolyzing the reaction product obtained by oxidizing meta-xylene and para-xylene with water, sulfur and ammonia. Approximaetly 40% of the carboxylic acid groups of the phthalic acids were in the form of the amide and approximately 60% in the form of the ammonium salt. The amide salt mixture was charged to a bomb reactor with water and mineral acid and rapidly heated to hydrolysis temperature and shaken to agitate the mixture throughout the hydrolysis.

In the table the heading "Phthalic concentration in grams per 100 cc." indicates the number of grams of crude reaction product per 100 cc. of total liquid present during the hydrolysis reaction. The initial sulfuric acid normality is the normal concentration of hydrogen ion after mixing the crude reaction product, water and acid as determined by titration. Upon mixing, the ammonium salt portion of the crude reaction product reacts with a part of the charged acid before hydrolysis of the amide portion of the crude reaction product begins. The tabulated sulfuric acid normality is the hydrogen ion concentration of the reaction mixture, as determined by titration, after reaction of the ammonium salt with a part of the acid and before amide hydrolysis begins. The heading "Moles of sulfuric acid per mole of phthalics" indicates the number of moles of sulfuric acid charged to the hydrolysis reaction per aggregate mole of ammonium salt, amide and mixed salt-amide of the phthalic acids contained in the reaction product.

*Table I*

| Run No. | | Temp., °F. | Time at Temp. | Phthalic Conc., g./100 cc. | $H_2SO_4$ Normality | | Moles, $H_2SO_4$/Mole Phthalics | Hydrolyzed Product | | Percent Amide Hydrolyzed |
|---|---|---|---|---|---|---|---|---|---|---|
| | | | | | Initial [1] | Final | | Neutral Equivalent | Percent Nitrogen | |
| 1 | | 976-36-4 | 400 | 60 min | 13.9 | pH 4-5 | pH 5.85 | 0.67 | 88.3 | 0.66 | 85.7 |
| 2 | | 1032-392 | 500 | 60 min | 15 | est. pH 4 | pH 6 | 0.69 | | 0.60 | |
| 3 | | 976-35 | 392 | 30 min | 7.0 | 0.53 | 0.32 | 1.41 | 85.1 | 0.35 | 92.3 |
| 4 | | 976-35 | 392 | 60 min | 6.8 | 0.53 | 0.33 | 1.46 | 84.6 | 0.21 | 95.7 |
| 5 | | 1032-32c | 500 | 15 min | 10.7 | 1.17 | 0.90 | 1.79 | 84.3 | 0.12 | 96.8 |
| 6 | | 976-30 | 392 | 30 min | 6.3 | 0.56 | 0.40 | 1.57 | 84.4 | 0.28 | 92.4 |
| 7 | | 976-31 | 392 | 30 min | 20.9 | 1.36 | 0.69 | ~1.2 | 83.8 | 0.09 | 98.3 |
| 8 | | 976-31 | 390 | 60 min | 19.9 | 1.54 | 0.89 | 1.32 | 83.8 | 0.06 | 98.8 |
| 9 | | 976-31 | 392 | 2 hrs | 20.0 | 1.47 | 0.82 | 1.32 | 83.8 | 0.06 | 98.8 |
| 10 | | 1032-8a | 400 | 30 min | 12.7 | 2.05 | 1.65 | 2.19 | 83.3 | 0.01 | 99.8 |
| 11 | | 1032-8b | 400 | 60 min | 12.5 | 2.06 | 1.65 | 2.19 | 83.7 | 0.006 | 99.9 |
| 12 | | 1032-8c | 400 | 30 min | 10.9 | 3.24 | 2.95 | 3.33 | | <0.01 | >99.8 |

[1] Initial $H_2SO_4$ normality after reaction of added $H_2SO_4$ with ammonium salts present.

Runs 1 and 2 show the results obtained when the quantity of sulfuric acid charged is less than 1 equivalent per equivalent of combined nitrogen contained in the amide salt mixture. It will be noted that the nitrogen content of the hydrolysis product in both instances is very high and these phthalic acids would be entirely unsuited for use in alkyd manufacture, since the resins would be extremely dark in color. Runs 3, 4, 5 and 6 show the results obtained when the hydrolysis is conducted with amounts of sulfuric acid such that there is more than 1 and less than 2 equivalents of sulfuric acid per gram atom of nitrogen contained in the amide-salt mixture charged. Again, the amide nitrogen contents of the acids produced are so high that it would be impossible to make an acceptable alkyd resin from these acids. Runs 7, 8 and 9 show that increasing the time of reaction does not increase completeness of hydrolysis when less than 2 equivalents of mineral acid per gram atom of combined nitrogen are employed. Runs 10, 11 and 12 show the results obtained when the hydrolysis is conducted with more than 2 equivalents of acid per gram atom of combined nitrogen contained in the amide-salt mixture charged.

The appended drawings are graphical representations of data obtained in further studies of the hydrolysis reaction.

Figure 1 indicates that if the number of the equivalents of mineral acid per gram atom of combined nitrogen contained in the charge to the hydrolysis reaction is less than 2, complete decomposition of the amide is not achieved by prolonging the reaction time.

Figure 2:
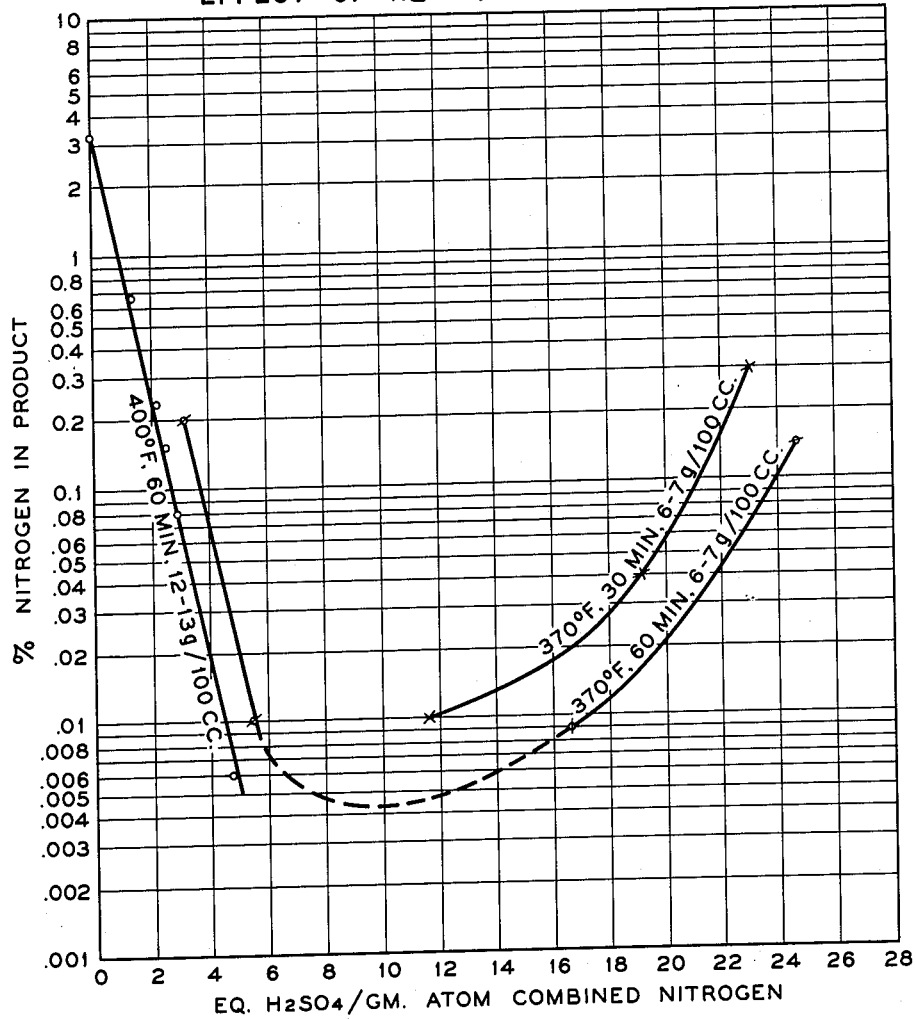

Figure 2 indicates the effect of the ratio of mineral acid to combined nitrogen contained in the amide charged to the hydrolysis reaction.

It will be noted that the nitrogen content in the organic acid product falls below 0.02 only when the number of equivalents of mineral acid per gram atom of combined nitrogen is greater than 2. It will be noted that when the number of equivalents of mineral acid per gram atom of combined nitrogen rises to higher values of the order of 10 to 12, the nitrogen content of the organic acid product also rises. This increase in nitrogen content which attends the use of excess mineral acid is the result of a rate effect rather than an equilibrium effect and, if the reaction time is increased sufficiently, satisfactorily low product nitrogen contents can be achieved even at very high mineral acid to amide ratios.

The controlling factor in causing rate decrease at high mineral acid to amide ratios is not simply the mineral acid to amide ratio, but is the normal concentration of hydrogen ion in the hydrolysis mixture after reaction of the ammonium salt portion of the feed with a portion of the mineral acid and before amide hydrolysis gets under way. The data in Table II indicate the manner in which the hydrolysis rate is effected as hydrogen ion concentration is increased.

*Table II*

| Temperature | Time, min. | Moles $H_2SO_4$/ Moles Phthalics | N Conc. $H^+$ | Percent N in Product |
|---|---|---|---|---|
| 370 | 30 | 5.8 | 4.03 | 0.01 |
| 370 | 30 | 9.6 | 6.4 | 0.04 |
| 370 | 30 | 11.5 | 8.6 | 0.3 |
| 370 | 60 | 2.8 | 1.69 | 0.01 |
| 370 | 60 | 8.3 | 5.3 | 0.009 |
| 370 | 60 | 12.3 | 8.6 | 0.14 |

The hydrogen ion concentration of the hydrolysis reaction mixture after the ammonium salts contained in the feed have been decomposed and before the amide hydrolysis is under way should not exceed about 6.5 normal if undesirable rate effects are to be avoided. Where the material to be hydrolyzed is a phthalic acid amide essentially free of ammonium salts, the hydrogen ion concentration is directly determined by the quantities of mineral acid and water charged to the hydrolysis reaction, since in this case no part of the acid is used up in reacting with ammonium salts.

Where a mixture of ammonium salts and amides of phthalic acids produced by oxidizing xylenes with water, sulfur and ammonia, for example, is to be converted to phthalic acids, the conversion can be effected in two stages if desired. In the first stage sufficient sulfuric acid is added to the reaction product to liberate the organic acid which is in the form of ammonium salts. This can be done at room temperature or at moderately elevated temperatures and is a very rapid reaction in either case. The resulting mixture is then filtered and a filter cake consisting of phthalic acids, phthalic acid diamides and phthalic acid monoamides is recovered. This filter cake is then mixed with water and a strong mineral acid in proportions such that the mixture contains more than 2 equivalents of acid per gram atom of combined nitrogen and has a hydrogen ion concentration in the range from 0.5 to 6.5 normal. This mixture is then heated to a temperature from about 300° F. to 550° F. under a superatmospheric pressure sufficient to maintain the water in liquid phase and essentially complete hydrolysis of the amide occurs.

I claim:

1. A process for hydrolyzing amides of phthalic acids to produce a phthalic acid product having a nitrogen content below about 0.03% by weight which comprises heating the amide with water and a quantity of strong mineral acid in excess of two equivalents per gram atom of combined nitrogen contained in the amide feed, to a temperature above about 300° F.

2. A process as defined in claim 1, wherein the amide, water and acid are heated to a temperature in the range from 400° F. to 550° F.

3. A process as defined in claim 1, wherein the quantity of acid added is in the range from two equivalents to ten equivalents per gram atom of combined nitrogen contained in the amide feed.

4. A process as defined in claim 1, wherein the strong mineral acid is sulfuric acid.

5. A process for producing isophthalic acid and terephthalic acid having a nitrogen content below about 0.03% by weight from impure acids having a combined nitrogen content substantially above 0.03% by weight which comprises heating the impure acid with water and a quantity of sulfuric acid in excess of two equivalents per gram atom of combined nitrogen contained in the mixture to a temperature in the range from about 300° F. to 550° F.

6. The method as defined in claim 5, wherein the proportions of acid and water employed are such that the hydrogen ion concentration of the resultant mixture prior to heating is below 6.5 normal.

References Cited in the file of this patent

UNITED STATES PATENTS 2,610,980     Naylor _____ Sept. 16, 1952